US012687197B2

(12) United States Patent
Bierlein et al.

(10) Patent No.: US 12,687,197 B2
(45) Date of Patent: Jul. 21, 2026

(54) DOUBLE-ROW ROLLING BEARING

(71) Applicant: Schaeffler Technologies AG & Co. KG, Herzogenaurach (DE)

(72) Inventors: Andreas Bierlein, Haßfurt (DE); Dietmar Nusch, Wetter a.d.Ruhr (DE); Sascha Hess, Schweinfurt (DE); Rainer Schroeder, Egenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 11 days.

(21) Appl. No.: 18/851,982

(22) PCT Filed: Mar. 22, 2023

(86) PCT No.: PCT/DE2023/100218
§ 371 (c)(1),
(2) Date: Sep. 27, 2024

(87) PCT Pub. No.: WO2023/186212
PCT Pub. Date: Oct. 5, 2023

(65) Prior Publication Data
US 2025/0207630 A1     Jun. 26, 2025

(30) Foreign Application Priority Data
Mar. 31, 2022   (DE) ..................... 10 2022 107 676.8

(51) Int. Cl.
*F16C 19/38*      (2006.01)
*F16C 23/08*      (2006.01)
(Continued)

(52) U.S. Cl.
CPC ............ *F16C 19/38* (2013.01); *F16C 23/086* (2013.01); *F16C 25/083* (2013.01); *F16C 33/46* (2013.01); *F16C 33/60* (2013.01); *F16C 2229/00* (2013.01)

(58) Field of Classification Search
CPC ...... F16C 19/38; F16C 23/082; F16C 23/084; F16C 23/086; F16C 25/08; F16C 25/083;
(Continued)

(56) References Cited

U.S. PATENT DOCUMENTS 1,332,444 A     3/1920   Werner
2,651,554 A     9/1953   Recknagel
(Continued)

FOREIGN PATENT DOCUMENTS

AT         521218 A1     11/2019
DE         1769651 U      7/1958
(Continued)

OTHER PUBLICATIONS

DE19916580A1_DESCRIPTION.*
European Patent Office, Examination Report for Application No. EP23715741.7 dated May 6, 2026, 27 pages.

*Primary Examiner* — Phillip A Johnson
(74) *Attorney, Agent, or Firm* — Suiter Swantz IP

(57)         ABSTRACT

A double-row rolling bearing, having a split inner ring, an outer ring, rolling elements, and at least one cage. The split inner ring having at least on inner ring race, and the outer ring (4) having at least one outer ring race. The rolling elements being arranged such that they are mutually spaced in the cage and roll between the inner ring and the outer ring, and the rolling elements being designed as rolling element rollers, and the bearing being designed in an X arrangement. The split inner ring is split into two annular inner ring parts, and the two inner ring parts are preloaded with a preloading means arranged therebetween.

19 Claims, 3 Drawing Sheets

(51) Int. Cl.
    *F16C 25/08*      (2006.01)
    *F16C 33/46*      (2006.01)
    *F16C 33/60*      (2006.01)
(58) Field of Classification Search
    CPC .............. F16C 33/4605; F16C 33/4641; F16C
                    33/4658; F16C 33/4664; F16C 33/60;
                    F16C 2229/00
    See application file for complete search history.

(56)                   References Cited

U.S. PATENT DOCUMENTS

| | | | |
|---|---|---|---|
| 4,798,482 A | 1/1989 | Kruk | |
| 2007/0127858 A1 * | 6/2007 | Nakagawa ............ | F16C 19/505 |
| | | | 384/495 |
| 2020/0088235 A1 * | 3/2020 | Berg ....................... | F16C 23/08 |

FOREIGN PATENT DOCUMENTS

| | | | | |
|---|---|---|---|---|
| DE | 1933903 U | 3/1966 | | |
| DE | 19916580 A1 * | 10/1999 | ............. | F16C 25/08 |
| DE | 102007055362 A1 | 5/2009 | | |
| DE | 102012222501 A1 * | 6/2014 | ............. | F16C 25/06 |
| DE | 102014202147 A1 | 8/2015 | | |
| EP | 1837535 A1 | 9/2007 | | |
| FR | 936515 A | 7/1948 | | |
| GB | 2073332 A | 10/1981 | | |

* cited by examiner

DOUBLE-ROW ROLLING BEARING

CROSS-REFERENCE TO RELATED APPLICATIONS

This application is the U.S. National Phase of PCT Appln. No. PCT/DE2023/100218 filed Mar. 22, 2023, which claims priority to DE 10 2022 107 676.8 filed Mar. 31, 2022, the entire disclosures of which are incorporated by reference herein.

TECHNICAL FIELD

The disclosure relates to a double-row rolling bearing which has a preloaded inner ring.

BACKGROUND

DE 10 2019 104 395 A1 discloses a spherical roller bearing. The spherical roller bearing has an outer ring, an inner ring and, between the two bearing rings, two rows of roller bodies that are inclined towards one another and guided in cages. The bearing has an outer ring split in the axial direction, which is split into two bearing ring parts spaced apart from one another. In order to ensure the functionality of such a bearing in an X arrangement, it is installed in a housing and the bearing outer rings are braced against one another. This means that a preload defined by the geometric boundary conditions is applied by means of the bearing installation. In this regard, the preload influences the running characteristics and service life.

Furthermore, it is known from the prior art, for example, to preload double-row tapered roller bearings on the axially split outer rings, for example by means of the defined insertion of fitting rings, as shown in CN201368122 Y.

SUMMARY

The object of the present disclosure is to provide a further developed roller bearing which has improved running characteristics and an extended service life compared to the prior art.

In order to achieve the object according to the disclosure, the double-row rolling bearing described herein. Optional advantageous embodiments of the disclosure are described herein.

The double-row rolling bearing according to the disclosure has a split inner ring, an outer ring, rolling elements and at least one cage. The inner ring has at least one inner ring raceway and the outer ring has at least one outer ring raceway. The rolling elements, which are designed as rolling element rollers, roll in two rows between the inner ring and outer ring and are arranged at a distance from one another in the at least one cage. The bearing forms an X arrangement. The inner ring is split into two annular inner ring parts and the two inner ring parts are preloaded against one another with a preloading means arranged therebetween.

If a double-row roller bearing is to be preloaded, this has so far been done exclusively via an external force, i.e., via an axial force applied by the outer ring when the bearing is installed. This is due to the fact that the bearing is pressed or shrunk onto the shaft during mounting and an axial movement of the inner ring is no longer possible thereafter. In contrast, the outer ring can be braced as required when mounted in a housing. Contrary to this design, however, the disclosure proposes splitting the inner ring into two annular inner ring parts and preloading them against one another with a central preloading element. This means that in this case, contrary to the usual technical implementation, the inner ring must remain movable after mounting. Surprisingly, it has been shown that this type of preloading of the inner ring parts ensures a continuous, i.e., constant preload of the rolling bearing under a wide range of operating conditions, thus improving the running characteristics and service life.

The preload of the preloading means applied to the two annular inner ring parts results in a variable bearing clearance or a variable operating clearance, respectively. This allows a constant preload to be generated within the bearing, which makes the load zone ideal and continuous even under the influence of temperature differences. Furthermore, the proposed bearing can compensate short-term high loads and thus counteract overloading of the bearing.

The term "cage" as used herein may refer to any type of cage design. The disclosure is, furthermore, not restricted with respect to the material of which the cage is made. It is further conceivable for the cage to be formed of one or multiple parts.

In principle, the disclosure is suitable for all rolling element rollers, i.e., roller-shaped rolling elements of any kind. In a preferred embodiment, however, the bearing is designed as a spherical roller bearing, as the preload of the inner ring is particularly effective in this case.

In a further preferred embodiment, the preloading element of the double-row rolling bearing is designed as one or more springs. Any type of spring is conceivable here, for example disc springs or wave springs. In this case, the preload is not generated by a full-volume body, but by a spring.

Preferably, the preloading element applies a preload F(axial) of between 0.0001 and 0.15*basic static load rating $C_{0r}$ of the rolling bearing. It has been found that this range is particularly suitable for use with a preloading element between two inner ring halves. In a particularly preferred design, the preloading element of the double-row rolling bearing applies a preload F(axial) of between 0.05+/− 0.01*basic static load rating $C_{0r}$ of the rolling bearing to the inner ring parts.

In the case of increased axial load on a double-row rolling bearing as a fixed bearing, the axial forces can be transmitted via a shaft shoulder to the inner ring via the resilient element into the rollers to the outer ring or into the housing. In this regard, the resilient element can be completely deflected, i.e., come into a direct "inner ring part-resilient element-inner ring part" contact. It is conceivable to design the resilient element in such a way that it limits the minimum permissible travel between the inner ring halves in the deflected state. When using resilient elements, which could be damaged or lose preload in the long term if they were to be completely deflected, it is conceivable to limit the movability of the two inner ring parts in the axial direction relative to one another by means of a shoulder on one of the inner ring parts. This can be achieved by one or more shoulders on one or both of the inner ring halves, or by a partially or fully circumferential shoulder.

In a further preferred embodiment, the cage is formed of multiple parts. This has the advantage that the two cage parts can move relative to one another, thus preventing jamming in the event of different axial positions of the rows of rolling elements caused by the possibility of movement of the two inner ring parts.

To further support this, the cage is preferably guided on the outer ring.

The double-row rolling bearing can be mounted in a housing and have a shaft passing through it. It is also conceivable to design the outer ring of the double-row rolling bearing in two parts in order to be able to mount the bearing easily. In this case, the outer ring can be brought into a predetermined position using one or more fitting rings.

BRIEF DESCRIPTION OF THE DRAWINGS

Further details, features, combinations of features and effects based on the disclosure are shown in the following description of a preferred exemplary embodiment of the disclosure and in the drawing. In the figures.

DETAILED DESCRIPTION

In the figures, identical or similarly acting parts are designated with the same reference signs.

Figure 1:
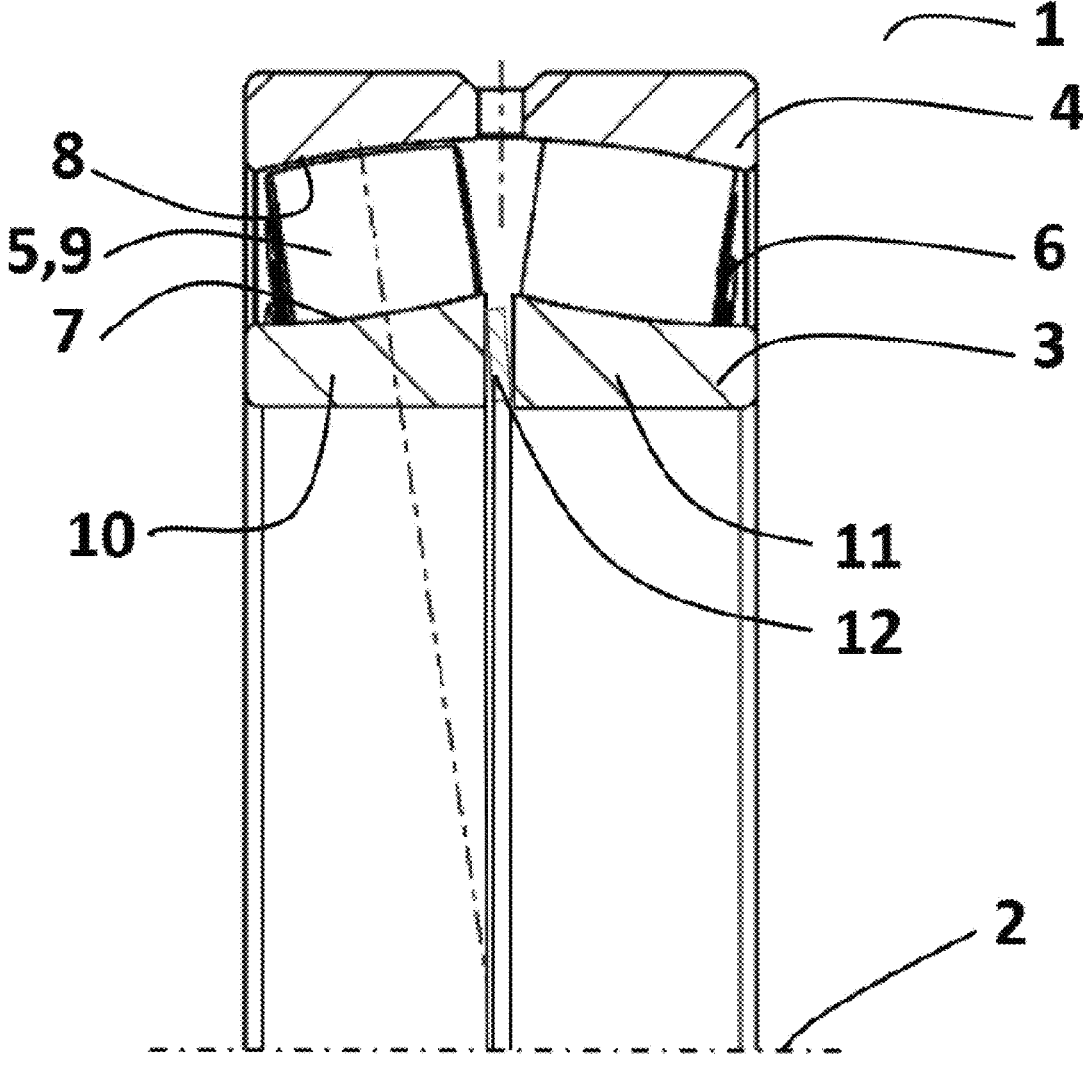
FIG. 1 shows a sectional view of an exemplary embodiment of a double-row rolling bearing according to the disclosure.

FIG. 1 shows a sectional view of an exemplary embodiment of a double-row rolling bearing 1 according to the disclosure with an axis of rotation 2. The double-row rolling bearing 1 has a split inner ring 3, an outer ring 4, rolling elements 5 and a cage 6, wherein the split inner ring 3 has an inner ring raceway 7 for each row of rolling elements and the outer ring 4 has an outer ring raceway 8 and the rolling elements 5, which are designed as rolling element rollers 9, are arranged between the inner ring 3 and the outer ring 4 so as to roll in the cage 6 at a distance from one another. The bearing is designed in an X arrangement. The inner ring 4 is split axially in multiple parts into two inner ring parts 10 and 11, wherein the two inner ring parts 10 and 11 are preloaded against one another with a preloading means arranged therebetween. In the embodiment shown here, the rolling element rollers 9 of the double-row rolling bearing are formed as spherical rollers. Furthermore, the preloading element is designed as a spring, wherein other elements are also conceivable.

Figure 2:
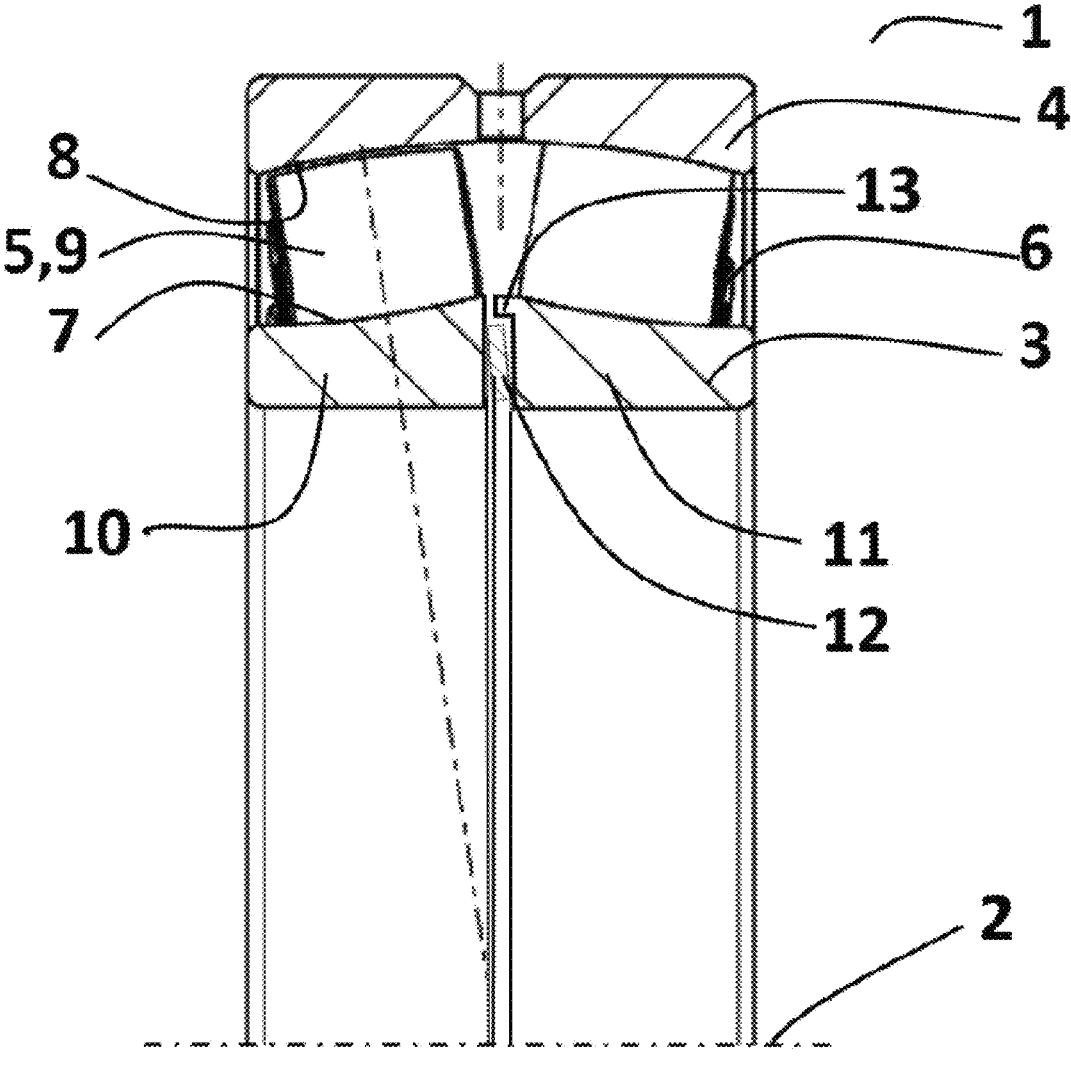
FIG. 2 shows a sectional view of a further exemplary embodiment of a double-row rolling bearing according to the disclosure and FIG. 3 shows a sectional view of a bearing arrangement with a double-row rolling bearing according to the embodiment shown in FIG. 1.

FIG. 2 shows a further embodiment in a sectional view, wherein the movability of the two inner ring parts in the axial direction relative to one another is limited by a shoulder 13 on one of the inner ring parts, in this case on the inner ring part 11. Of course, the shoulder can also be provided on the other inner ring part 10 and be of a different design.

Figure 3:
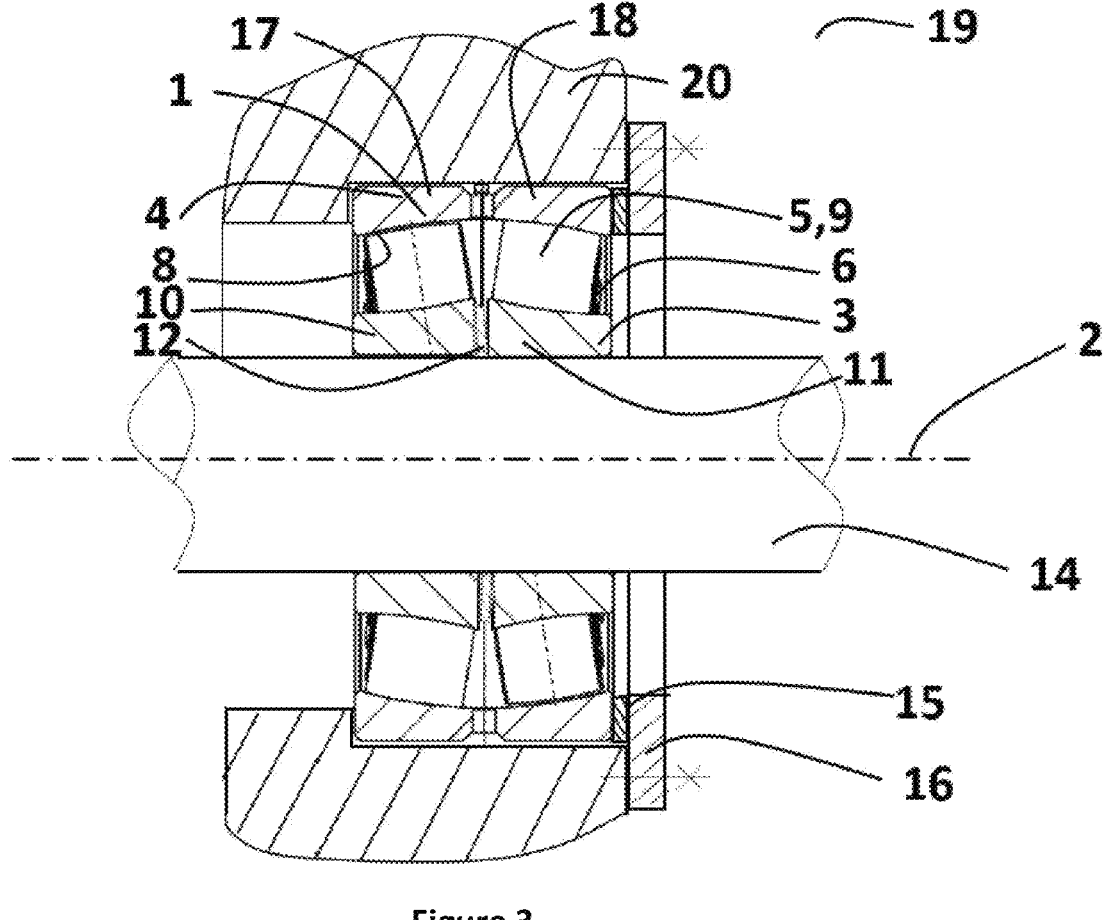

FIG. 3 shows a sectional view of a bearing arrangement 19 with the proposed double-row rolling bearing in an exemplary embodiment according to FIG. 1. Here, the double-row rolling bearing has a shaft 14 passing through it and the outer ring 4 is mounted in a housing 20. In this exemplary embodiment, the outer ring of the double-row rolling bearing 1 is formed of two parts. In this case, the outer ring 4, consisting of two outer ring parts 17 and 18, can be fastened by means of a fastening element 16. In this regard, one or more fitting rings 15 can be used to adjust the preload force.

LIST OF REFERENCE SIGNS

1 Double-row rolling bearing
2 Axis of rotation

3 Inner ring
4 Outer ring
5 Rolling element
6 Cage
7 Inner ring raceway
8 Outer ring raceway
9 Rolling element rollers
10 Inner ring part
11 Inner ring part
12 Preloading element
13 Shoulder
14 Shaft
15 Fitting ring
16 Fastening element
17 Outer ring part
18 Outer ring part
19 Bearing arrangement
20 Housing
F(axial) Axial preload force
$C_{0r}$ Basic static load rating of the rolling bearing

The invention claimed is:

1. A double-row rolling bearing, comprising:
a split inner ring;
an outer ring comprising two outer ring parts; rolling elements; and
at least one cage, the split inner ring has at least one inner ring raceway and the outer ring has at least one outer ring raceway, the rolling elements are arranged between the split inner ring and the outer ring so as to roll in the at least one cage at a distance from one another, the rolling elements are rolling element rollers, the double-row rolling bearing is in an X arrangement, the split inner ring is split into two annular inner ring parts and the two annular inner ring parts are preloaded with a preloading element arranged therebetween.

2. The double-row rolling bearing according to claim 1, wherein the rolling element rollers are formed as spherical rollers.

3. The double-row rolling bearing according to claim 1, wherein the preloading element is a spring.

4. The double-row rolling bearing according to claim 3, wherein a movability of the two annular inner ring parts in an axial direction relative to one another is limited by at least one shoulder on one of the two annular inner ring parts.

5. The double-row rolling bearing according to claim 4, wherein the at least one shoulder is disposed radially outwards of the spring.

6. The double-row rolling bearing according to claim 1, wherein the preloading element applies a preload F(axial) of between 0.0001 and 0.15*basic static load rating $C_{0r}$ of the double-row rolling bearing to the two annular inner ring parts.

7. The double-row rolling bearing according to claim 1, wherein the preloading element applies a preload F(axial) of between 0.05+/−0.01*basic static load rating $C_{0r}$ of the double-row rolling bearing to the two annular inner ring parts.

8. The double-row rolling bearing according to claim 1, wherein the at least one cage is formed of multiple parts.

9. The double-row rolling bearing according to claim 1, wherein the at least one cage is guided on the outer ring.

10. A bearing arrangement having a double-row rolling bearing according to claim 1, wherein a shaft passes through the double-row rolling bearing, wherein the outer ring is mounted in a housing.

11. The double-row rolling bearing according to claim 1, wherein the two outer ring parts of the outer ring are fastened by a fastening element.

12. A bearing arrangement comprising:

a double-row rolling bearing comprising:

a split inner ring;

an outer ring comprising two outer ring parts;

rolling elements; and at least one cage, the split inner ring has at least one inner ring raceway and the outer ring has at least one outer ring raceway, the rolling elements are arranged between the split inner ring and the outer ring so as to roll in the at least one cage at a distance from one another, the rolling elements are rolling element rollers, the double-row rolling bearing is in an X arrangement, the split inner ring is split into two annular inner ring parts and the two annular inner ring parts are preloaded with a preloading element arranged therebetween;

a shaft passing through the double-row rolling bearing; and a housing, the outer ring is mounted in the housing.

13. The bearing arrangement according to claim 12, wherein the rolling element rollers are formed as spherical rollers.

14. The bearing arrangement according to claim 12, wherein the preloading element is a spring.

15. The bearing arrangement according to claim 12, wherein the preloading element applies a preload F(axial) of between 0.0001 and 0.15*basic static load rating $C_{0r}$ of the double-row rolling bearing to the two annular inner ring parts.

16. The bearing arrangement according to claim 12, the preloading element applies a preload F(axial) of between 0.05+/−0.01*basic static load rating C0r of the double-row rolling bearing to the two annular inner ring parts.

17. The bearing arrangement according to claim 12, wherein a movability of the two annular inner ring parts in an axial direction relative to one another is limited by at least one shoulder on one of the two annular inner ring parts.

18. The bearing arrangement according to claim 12, wherein the at least one cage is formed of multiple parts.

19. The bearing arrangement according to claim 12, wherein the at least one cage is guided on the outer ring.

* * * * *